(12) United States Patent
Ding

(10) Patent No.: US 12,457,604 B2
(45) Date of Patent: Oct. 28, 2025

(54) COMMUNICATION METHOD AND APPARATUS

(71) Applicant: Huawei Technologies Co., Ltd., Shenzhen (CN)

(72) Inventor: Cheng Ding, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 390 days.

(21) Appl. No.: 18/007,623

(22) PCT Filed: Apr. 16, 2021

(86) PCT No.: PCT/CN2021/087900
§ 371 (c)(1),
(2) Date: Dec. 1, 2022

(87) PCT Pub. No.: WO2021/244160
PCT Pub. Date: Dec. 9, 2021

(65) Prior Publication Data
US 2023/0247624 A1    Aug. 3, 2023

(30) Foreign Application Priority Data

Jun. 2, 2020 (CN) .......................... 202010488924.6

(51) Int. Cl.
*H04L 1/18* (2023.01)
*H04W 72/1268* (2023.01)

(52) U.S. Cl.
CPC .............. *H04W 72/1268* (2013.01)

(58) Field of Classification Search
CPC ... H04L 1/0057; H04L 1/1822; H04L 1/1887; H04L 1/1896; H04W 72/1268
See application file for complete search history.

(56) References Cited

U.S. PATENT DOCUMENTS 10,958,380 B2 * 3/2021 Park ................. H04L 1/1812
2018/0302191 A1 * 10/2018 Park ................. H04W 72/23
(Continued)

FOREIGN PATENT DOCUMENTS

BR   112019025564 A2 *  6/2020  .............. H04L 1/00
EP       2537386 B1       9/2019
WO    2018201984 A1      11/2018

OTHER PUBLICATIONS

3GPP TS 38.211 V16.1.0, Mar. 2020, 3rd Generation Partnership Project; Technical Specification Group Radio Access Network; NR; Physical channels and modulation (Release 16), Technical Specification, 130 pages.

(Continued)

*Primary Examiner* — Phuc H Tran
(74) *Attorney, Agent, or Firm* — Conley Rose, P.C.

(57) ABSTRACT

A communication method includes determining by a terminal device a transport block (TB), sending a first code block group (CBG) to a network device on a first time domain resource, and disabling a transmission function of the terminal device on a second time domain resource. The TB includes the first CBG and a second CBG. If the network device successfully receives the first CBG on the first time domain resource, and determines, on the second time domain resource, that the terminal device does not enable the transmission function, the network device determines that the TB is successfully received.

20 Claims, 6 Drawing Sheets

(56) References Cited

U.S. PATENT DOCUMENTS

| | | | | |
|---|---|---|---|---|
| 2020/0170033 A1* | 5/2020 | Gao | .................... | H04L 1/1896 |
| 2020/0313807 A1* | 10/2020 | Salem | .................. | H04L 1/1607 |
| 2020/0374040 A1* | 11/2020 | Lou | ...................... | H04L 5/0055 |
| 2021/0135791 A1* | 5/2021 | Wang | .................. | H04L 1/0075 |

OTHER PUBLICATIONS

3GPP TS 38.212 V16.1.0, Mar. 2020, 3rd Generation Partnership Project; Technical Specification Group Radio Access Network; NR; Multiplexing and channel coding (Release 16), Technical Specification, 146 pages.

3GPP TS 38.214 V16.1.0 Mar. 2020, 3rd Generation Partnership Project; Technical Specification Group Radio Access Network; NR; Physical layer procedures for data (Release 16), Technical Specification, 151 pages.

* cited by examiner

COMMUNICATION METHOD AND APPARATUS

CROSS-REFERENCE TO RELATED APPLICATIONS

This is a U.S. National Stage of International Patent Application No. PCT/CN2021/087900 filed on Apr. 16, 2021, which claims priority to Chinese Patent Application No. 202010488924.6 filed on Jun. 2, 2020. Both of the aforementioned applications are hereby incorporated by reference in their entireties.

TECHNICAL FIELD

This application relates to the field of communication technologies, and in particular, to a communication method and apparatus.

BACKGROUND

In a communication system, a terminal device sends data to a network device based on an uplink resource configured by the network device. In a manner, the terminal device sends an uplink scheduling request (scheduling request, SR) to the network device. After receiving the SR, the network device configures, for the terminal device, an uplink resource used to send a buffer status report (buffer status report, BSR). The BSR indicates a data volume of to-be-sent data of the terminal device. After receiving the BSR, the network device configures, for the terminal device, an uplink resource used to send the to-be-sent data, and the terminal device sends the to-be-sent data to the network device based on the uplink resource. Herein, the BSR or to-be-sent data generated by the terminal device may be referred to as valid data. In other words, the valid data is data that actually needs to be sent to the network device by the terminal device.

In this process, a data volume of a transport block (transport block, TB) scheduled by the network device may be greater than that of valid data that actually needs to be sent to the network device by the terminal device. For example, the network device does not know a data volume of a BSR, and a data volume of a TB scheduled by the network device may be greater than that of the BSR. After the terminal device pads the TB with valid data, if the TB still has remaining bits, the terminal device pads the TB with invalid data. The invalid data may be understood as padding. Table 1 shows a ratio of padding scheduled by an SR to a data volume of a TB in a simulation scenario. The data volume of the TB may be represented by a transport block size (transport block size, TBS).

TABLE 1

| Index | Heavy network load scenario | Light network load scenario |
| --- | --- | --- |
| Ratio of padding to a TBS | 41% | 61% |

When sending the TB to the network device, the terminal device needs to send a large amount of invalid data. This causes unnecessary power consumption.

SUMMARY

This application provides a communication method and apparatus, to help avoid unnecessary power consumption caused when a terminal device sends a TB to a network device.

According to a first aspect, this application provides a communication method, applicable to a communication system including a network device and a terminal device. The method includes: The terminal device determines a TB. The TB includes a first code block group (code block group, CBG) and a second CBG. The first CBG is used to carry valid data of the terminal device, or the first CBG is used to carry valid data and invalid data of the terminal device. The second CBG is used to carry invalid data of the terminal device. The first CBG corresponds to a first time domain resource, the second CBG corresponds to a second time domain resource, and the first time domain resource and the second time domain resource do not overlap. The terminal device sends the first CBG to the network device on the first time domain resource, and disables a transmission function of the terminal device on the second time domain resource. If the network device successfully receives the first CBG on the first time domain resource, and determines, on the second time domain resource, that the terminal device does not enable the transmission function, the network device determines that the TB is successfully received.

In a possible implementation, that the terminal device determines a TB includes: The terminal device determines that the TB includes m CBs, where m≥2. The terminal device uses first to $n^{th}$ CBs to carry the valid data of the terminal device, and pads $(n+1)^{th}$ to $m^{th}$ CBs with the invalid data, where 1≤n<m. The terminal device divides first to $k^{th}$ CBs into at least one first CBG, and divides $(k+1)^{th}$ to $m^{th}$ CBs into at least one second CBG. Each first CBG includes i CBs, and each second CBG includes i CBs, where n≤k<n+i, and i≥1.

In a possible implementation, that the first CBG corresponds to the first time domain resource, and the second CBG corresponds to the second time domain resource includes: The terminal device determines, based on a quantity of first CBGs and a quantity of second CBGs, time domain resources corresponding to the TB as the first time domain resource and the second time domain resource.

In a possible implementation, that the network device successfully receives the first CBG on the first time domain resource includes: The network device receives the first CBG on the first time domain resource, and determines that the first CBG is successfully decoded.

In a possible implementation, a time domain resource is a time-domain symbol.

Based on the foregoing technical solution, the terminal device sends the first CBG on the first time domain resource, and disables the transmission function on the second time domain resource (that is, does not send the second CBG), to reduce power consumption of the terminal device. Correspondingly, the network device determines, on the first time domain resource, that the terminal device sends data. In this case, the network device determines whether the first CBG is successfully received. If the network device determines, on the second time domain resource, that the terminal device does not send the data, the network device does not need to determine whether the second CBG is successfully received, to reduce a workload of the network device. In addition, the network device does not need to schedule the terminal device to retransmit the second CBG, so that interference between uplink signals in an entire new radio (new radio, NR) system can be reduced, and uplink resource utilization can be improved.

According to a second aspect, this application provides a communication method, including: A terminal device determines a TB. The TB includes a first CBG and a second CBG. The first CBG is used to carry valid data of the terminal device, or the first CBG is used to carry valid data and invalid data of the terminal device. The second CBG is used to carry invalid data of the terminal device. The first CBG corresponds to a first time domain resource, the second CBG corresponds to a second time domain resource, and the first time domain resource and the second time domain resource do not overlap. The terminal device sends the first CBG to a network device on the first time domain resource, and disables a transmission function of the terminal device on the second time domain resource.

In a possible implementation, that the terminal device determines a TB includes: The terminal device determines that the TB includes m CBs, where m≥2. The terminal device uses first to $n^{th}$ CBs to carry the valid data of the terminal device, and pads $(n+1)^{th}$ to $m^{th}$ CBs with the invalid data, where 1≤n<m. The terminal device divides first to $k^{th}$ CBs into at least one first CBG, and divides $(k+1)^{th}$ to $m^{th}$ CBs into at least one second CBG. Each first CBG includes i CBs, and each second CBG includes i CBs, where n≤k<n+i, and i≥1.

In a possible implementation, that the first CBG corresponds to the first time domain resource, and the second CBG corresponds to the second time domain resource includes: The terminal device determines, based on a quantity of first CBGs and a quantity of second CBGs, time domain resources corresponding to the TB as the first time domain resource and the second time domain resource.

In a possible implementation, a time domain resource is a time-domain symbol.

Based on the foregoing technical solution, the terminal device sends the first CBG on the first time domain resource, and disables the transmission function on the second time domain resource (that is, does not send the second CBG), to reduce power consumption of the terminal device. In addition, the terminal device does not send the second CBG (newly transmit or retransmit the second CBG), so that interference between uplink signals in an entire NR system can be reduced, and uplink resource utilization can be improved.

According to a third aspect, this application provides a communication method, including: A network device sends scheduling information to a terminal device. The scheduling information is used to indicate a time domain resource on which the terminal device sends a TB. The TB includes a first CBG and a second CBG. The first CBG carries valid data of the terminal device, or the first CBG carries valid data and invalid data of the terminal device. The second CBG carries invalid data of the terminal device. The first CBG corresponds to a first time domain resource, the second CBG corresponds to a second time domain resource, and the first time domain resource and the second time domain resource do not overlap. If the network device successfully receives the first CBG on the first time domain resource, and determines, on the second time domain resource, that the terminal device does not enable a transmission function, the network device determines that the TB is successfully received.

In a possible implementation, that the network device successfully receives the first CBG on the first time domain resource includes: The network device receives the first CBG on the first time domain resource, and determines that the first CBG is successfully decoded.

Based on the foregoing technical solution, the network device determines, on the first time domain resource, that the terminal device sends data. In this case, the network device determines whether the first CBG is successfully received. If the network device determines, on the second time domain resource, that the terminal device does not send the data, the network device does not need to determine whether the second CBG is successfully received. This can reduce a workload of the network device, compared with the conventional technology in which the network device needs to detect the first CBG received on the first time domain resource and detect the second CBG received on the second time domain resource. In addition, the network device does not schedule the terminal device to retransmit the second CBG, so that interference between uplink signals in an entire NR system can be reduced, and uplink resource utilization can be improved.

According to a fourth aspect, this application provides a communication apparatus. The communication apparatus has a function of implementing the terminal device in the second aspect. The function may be implemented by hardware, or may be implemented by hardware executing corresponding software. The hardware or software includes one or more units or modules corresponding to the foregoing function.

In a possible implementation, the communication apparatus may be a terminal device, or may be a module, for example, a chip, a chip system, or a circuit, that can be used in the terminal device.

In a possible implementation, the communication apparatus includes a processing unit and a transceiver unit. The processing unit is configured to determine a TB. The TB includes a first CBG and a second CBG. The first CBG is used to carry valid data of the terminal device, or the first CBG is used to carry valid data and invalid data of the terminal device. The second CBG is used to carry invalid data of the terminal device. The first CBG corresponds to a first time domain resource, the second CBG corresponds to a second time domain resource, and the first time domain resource and the second time domain resource do not overlap. The processing unit is further configured to control the transceiver unit to send the first CBG to the network device on the first time domain resource, and disable a transmission function of the terminal device on the second time domain resource.

In a possible implementation, the processing unit is specifically configured to: determine that the TB includes m CBs, where m≥2; use first to $n^{th}$ CBs to carry the valid data of the terminal device, and pad $(n+1)^{th}$ to $m^{th}$ CBs with the invalid data, where 1≤n<m; and divide first to $k^{th}$ CBs into at least one first CBG, and divide $(k+1)^{th}$ to $m^{th}$ CBs into at least one second CBG. Each first CBG includes i CBs, and each second CBG includes i CBs, where n≤k<n+i, and i≥1.

In a possible implementation, the processing unit is specifically configured to determine, based on a quantity of first CBGs and a quantity of second CBGs, time domain resources corresponding to the TB as the first time domain resource and the second time domain resource.

In a possible implementation, a time domain resource is a time-domain symbol.

For technical effects that can be achieved in the fourth aspect, refer to descriptions of advantageous effects in the second aspect. Details are not described herein again.

According to a fifth aspect, this application provides a communication apparatus. The communication apparatus has a function of implementing the network device in the third aspect. The function may be implemented by hardware, or may be implemented by hardware executing corresponding software. The hardware or software includes one or more units or modules corresponding to the foregoing function.

In a possible implementation, the communication apparatus may be a network device, or may be a module, for example, a chip, a chip system, or a circuit, that can be used in the network device.

In a possible implementation, the communication apparatus includes a processing unit and a transceiver unit. The transceiver unit sends scheduling information to a terminal device. The scheduling information is used to indicate a time domain resource on which the terminal device sends a TB. The TB includes a first CBG and a second CBG. The first CBG carries valid data of the terminal device, or the first CBG carries valid data and invalid data of the terminal device. The second CBG carries invalid data of the terminal device. The first CBG corresponds to a first time domain resource, the second CBG corresponds to a second time domain resource, and the first time domain resource and the second time domain resource do not overlap. If the processing unit determines, on the first time domain resource, that the transceiver unit successfully receives the first CBG, and determines, on the second time domain resource, that the terminal device does not enable a transmission function, the processing unit determines that the TB is successfully received.

In a possible implementation, the processing unit is specifically configured to: control the transceiver unit to receive the first CBG on the first time domain resource, and determine that the first CBG is successfully decoded.

For technical effects that can be achieved in the fifth aspect, refer to descriptions of advantageous effects in the third aspect. Details are not described herein again.

According to a sixth aspect, this application provides a chip, including a processor and an interface circuit.

The interface circuit is configured to receive code instructions and transmit the code instructions to the processor. The processor runs the code instructions, so that the method according to any one of the second aspect or the possible implementations of the second aspect or the method according to any one of the third aspect or the possible implementations of the third aspect is performed.

According to a seventh aspect, this application provides a communication apparatus, including a processor. The processor is connected to a memory. The memory is configured to store a computer program. The processor is configured to execute the computer program stored in the memory, so that the communication apparatus is enabled to perform the method according to any one of the second aspect or the possible implementations of the second aspect, or the communication apparatus is enabled to perform the method according to any one of the third aspect or the possible implementations of the third aspect.

According to an eighth aspect, this application provides a computer-readable storage medium. The computer-readable storage medium stores a computer program or instructions. When the computer program or the instructions is/are executed by a communication apparatus, the communication apparatus is enabled to perform the method according to any one of the second aspect or the possible implementations of the second aspect, or the communication apparatus is enabled to perform the method according to any one of the third aspect or the possible implementations of the third aspect.

According to a ninth aspect, this application provides a computer program product. The computer program product includes a computer program or instructions. When the computer program or the instructions is/are executed by a communication apparatus, the communication apparatus is enabled to perform the method according to any one of the second aspect or the possible implementations of the second aspect, or the communication apparatus is enabled to perform the method according to any one of the third aspect or the possible implementations of the third aspect.

DESCRIPTION OF EMBODIMENTS

The following describes in detail embodiments of this application with reference to the accompanying drawings.

Figure 1:
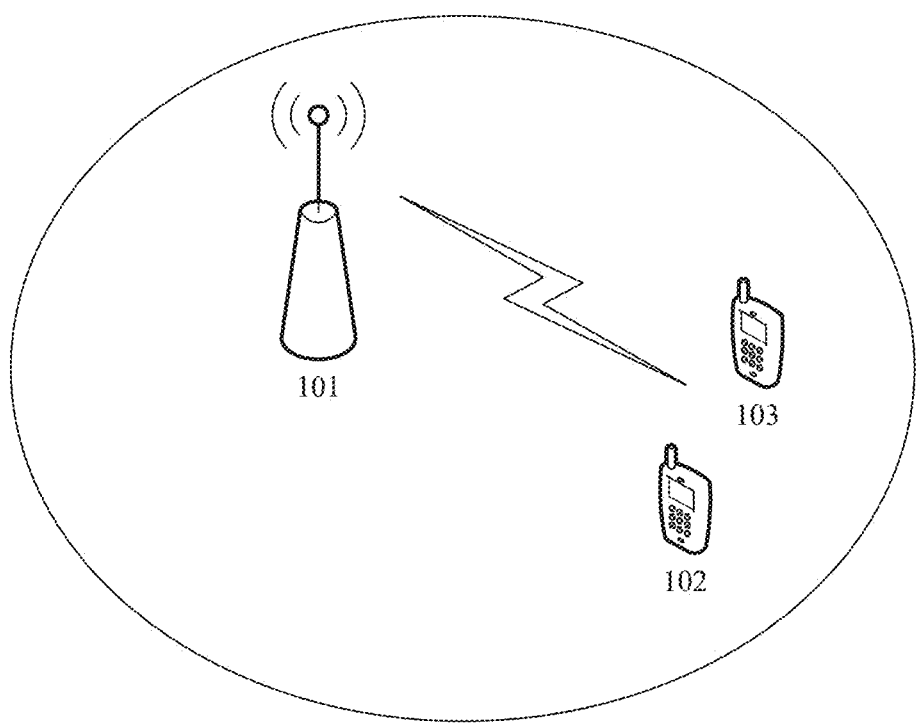
FIG. 1 is a schematic diagram of an architecture of a communication system according to this application.

FIG. 1 is a schematic diagram of an architecture of a communication system to which an embodiment of this application is applicable. The communication system includes a network device and a terminal device. The network device sends information to the terminal device through a downlink channel, and the terminal device sends information to the network device through an uplink channel. In FIG. 1, a network device 101, a terminal device 102, and a terminal device 103 are used as an example.

A network device in this embodiment of this application is a network-side entity configured to send a signal, receive a signal, or send a signal and receive a signal. The network device may be an apparatus that is deployed on a radio access network (radio access network, RAN) and that provides a wireless communication function for a terminal device, for example, may be a transmission reception point (transmission reception point, TRP), a network device, or control nodes in various forms (for example, a network controller and a radio controller (for example, a radio controller in a cloud radio access network (cloud radio access network, CRAN) scenario)). Specifically, the network device may be a macro network device, a micro network device (also referred to as a small cell), a relay station, an access point (access point, AP), or the like in various forms, or may be an antenna panel of the network device. The control node may be connected to a plurality of network devices, and schedule resources (resources this in embodiment of this application may also be referred to as grants) for a plurality of terminal devices covered by the plurality of network devices. In systems using different radio access technologies, a device having a function of a network device may be named differently. For example, the network device may be referred to as a next generation node base station (next generation node base station, gNB) in a 5G system or an NR system. A specific name of the network device is not limited in this application. The network device may alternatively be a network device in a future evolved public land mobile network (public land mobile network, PLMN) or the like. The technical solutions provided in embodiments of this application may also be applied to a future mobile communication system, for example, a 6G or 7G communication system. Therefore, the network device in FIG. 1 may alternatively correspond to an access network device in the future mobile communication system.

A terminal device in this embodiment of this application is a user-side entity configured to receive a signal, send a signal, or receive a signal and send a signal. The terminal device is configured to provide one or both of a voice service and a data connectivity service for a user. The terminal device may also be referred to as user equipment (user equipment), an access terminal, a subscriber unit, a subscriber station, a mobile station, a remote station, a remote terminal, a mobile device, a user terminal, a wireless communication device, a user agent, or a user apparatus. The terminal device may be a V2X device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (hybrid electric vehicle, HEV), a range extended electric vehicle (range extended EV, REEV), a plug-in hybrid electric vehicle (plug-in HEV, PHEV), a new energy vehicle (new energy vehicle), or a road side unit (road site unit, RSU). Alternatively, the terminal device may be a D2D device, for example, an electricity meter or a water meter. Alternatively, the terminal device may be a mobile station (mobile station, MS), a subscriber unit (subscriber unit), an unmanned aerial vehicle, an internet of things (internet of things, IoT) device, a station (station, ST) in a WLAN, a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device or another processing device connected to a wireless modem, a vehicle-mounted device, or a wearable device (which may also be referred to as a wearable intelligent device). Alternatively, the terminal device may be a terminal in a next-generation communication system, for example, a terminal in an NR system or a terminal in a future evolved PLMN.

Figure 2:
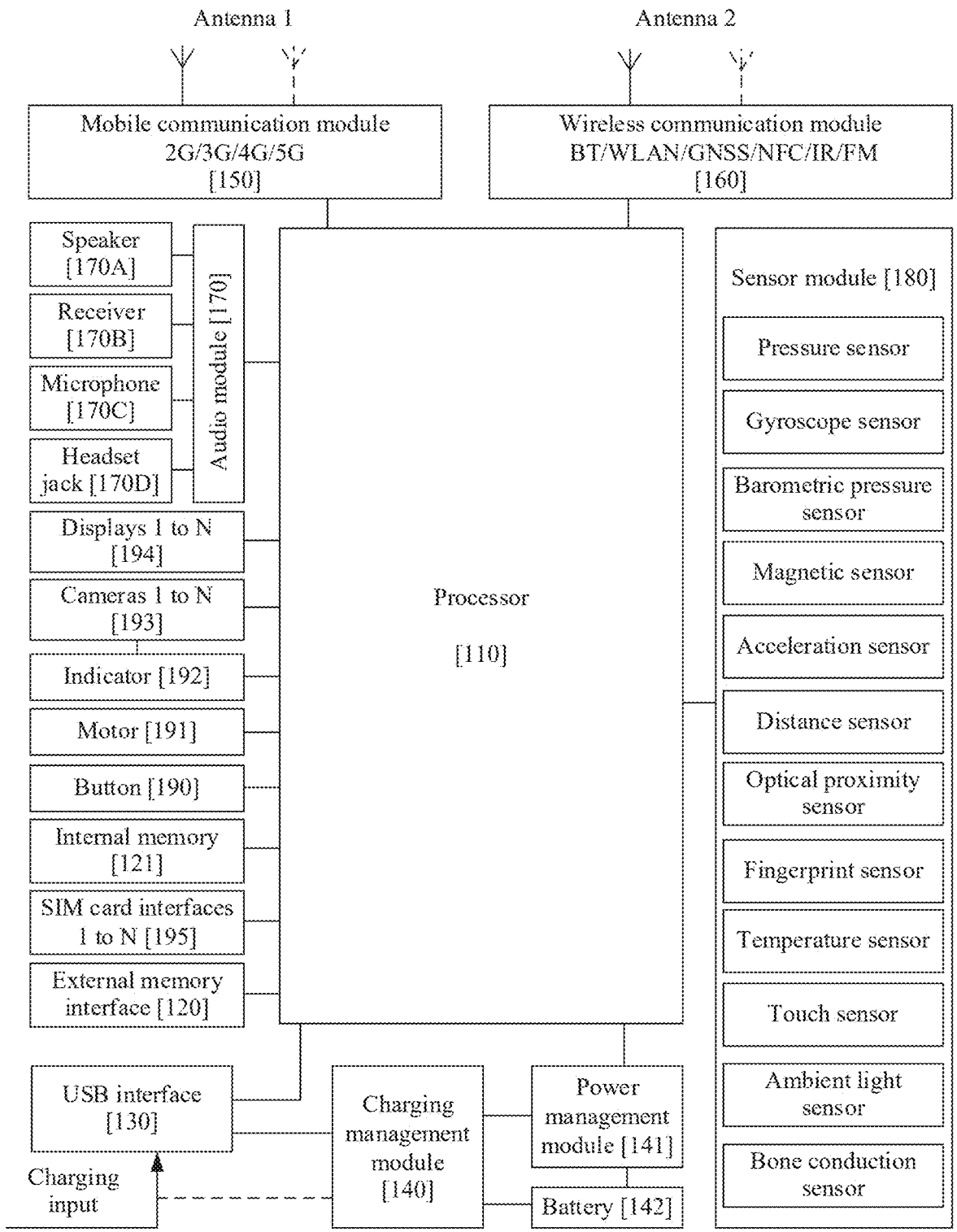
FIG. 2 is a schematic diagram of a structure of a terminal device according to an embodiment of this application.

For example, FIG. 2 is a schematic diagram of a structure of a terminal device according to an embodiment of this application. The terminal device may be the terminal device 102 and the terminal device 103 in FIG. 1. Specifically, as shown in FIG. 2, the electronic device includes a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The processor 110 may include one or more processing units. For example, the processor 110 may include an application processor (application processor, AP), a modem (modem), a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or two or more different processing units may be integrated into one component.

The controller may be a nerve center and a command center of the terminal device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. For example, the processor 110 includes the universal serial bus (universal serial bus, USB) interface 130, and the subscriber identity module (subscriber identity module, SIM) interface 195. For another example, the processor 110 may further include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and/or the like.

It can be understood that an interface connection relationship between the modules illustrated in this embodiment of this application is merely an example for description, and does not constitute a limitation on the structure of the terminal device. In some other embodiments of this application, the terminal device may alternatively use an interface connection manner different from that in the foregoing embodiments or a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the terminal device. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (leakage and impedance). In some other embodiments, the power management module 141 may alternatively be disposed in the processor 110. In some other embodiments, the power management module 141 and the charging management module 140 may alternatively be disposed in a same component.

A wireless communication function of the terminal device may be implemented through the antenna 1, the antenna 2, the mobile communication module 150, the wireless communication module 160, the modem, the baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the terminal device and that includes a standard such as 2G/3G/4G/5G. The mobile communication module 150 may include at least one filter, a switch, a power amplifier, a low noise amplifier (low noise amplifier, LNA), and the like.

The wireless communication module 160 may provide a solution that is applied to the terminal device and that is for wireless communication such as a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology.

In some embodiments, the antenna 1 of the terminal device is coupled to the mobile communication module 150, and the antenna 2 is coupled to the wireless communication module 160, so that the terminal device may communicate with a network and other devices by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GNSS), a Beidou navigation satellite system (Beidou navigation satellite system. BDS), a quasi-zenith satellite system (quasi-zenith satellite system, QZSS), and/or a satellite based augmentation system (satellite based augmentation system, SBAS).

The terminal device implements a display function by using the GPU, the display 194, the application processor, and the like. The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the terminal device may include one or N displays 194, where N is a positive integer greater than 1.

The terminal device may implement a photographing function by using the ISP, the camera 193, the video codec, the GPU, the display 194, the application processor, and the like. The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the terminal device may include one or N cameras 193, where N is a positive integer greater than 1.

The external memory interface 120 may be configured to connect to an external memory card, for example, a micro-SD card, to extend a storage capability of the terminal device. The external memory card communicates with the processor 110 through the external memory interface 120, to implement a data storage function. For example, a file such as music or a video is stored in the external memory card.

The internal memory 121 includes a running memory (memory) and a built-in memory. The running memory may be configured to store program instructions, data, or the like. The processor 110 runs the instructions stored in the running memory, to perform various function applications of the terminal device and data processing. For example, the running memory may include a high speed random access memory. The built-in memory may also be referred to as a built-in external memory or the like, and may be configured to store program instructions and/or data. For example, the built-in memory may store an operating system, an application, and the like. Generally, after the terminal device loads the program instructions and/or data in the built-in memory to the running memory, the processor 110 runs the corresponding program instructions and/or data to implement a corresponding function. In addition, the internal memory 121 may include a nonvolatile memory, for example, at least one magnetic disk storage device, a flash memory, and a universal flash storage (universal flash storage, UFS).

The terminal device may implement audio functions such as music playing and recording through the audio module 170, the speaker 170A, the receiver 170B, the microphone 170C, the headset jack 170D, the application processor, and the like.

The button 190 includes a power button, a volume button, and the like. The button 190 may be a mechanical button, may be a touch button. The terminal device may receive a button input, and generate a button signal input related to a user setting and function control of the terminal device.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. For touch operations performed on different areas of the display 194, the motor 191 may alternatively correspond to different vibration feedback effects. Different application scenarios (for example, a time reminder, information receiving, an alarm clock, and a game) may alternatively correspond to different vibration feedback effects. A touch vibration feedback effect may be further customized.

The indicator 192 may be an indicator light that may be configured to indicate a charging state and a battery power change, and may further be configured to indicate a message, a missed call, a notification, and the like.

It can be understood that, a structure illustrated in embodiments of this application does not constitute a specific limitation on the terminal device. In some other embodiments, the terminal device may include more or fewer components than those shown in the figure, or some components may be combined, or some components may be split, or there may be a different component layout. The components shown in the figure may be implemented by hardware, software, or a combination of software and hardware.

It should be noted that the network architecture and the service scenario described in embodiments of this application are intended to describe the technical solutions in embodiments of this application more clearly, and do not constitute a limitation on the technical solutions provided in embodiments of this application. A person of ordinary skill in the art may know that the technical solutions provided in embodiments of this application are also applicable to similar technical problems as a system structure evolves and a new service scenario emerges.

With reference to the network architecture shown in FIG. 1, a service scenario to which embodiments of this application are applicable is described as an example.

A terminal device sends data on an uplink resource configured by a network device. If the network device does not successfully receive the data sent by the terminal device, the network device needs to schedule the terminal device to resend the data.

In the conventional technology, a minimum unit in which the network device schedules the terminal device to send data is a TB. Specifically, after determining an uplink resource scheduled by the network device, the terminal device determines a data volume of the TB based on the uplink resource. The terminal device uses the TB to carry data, and sends the TB by using the uplink resource. If the network device determines that the TB is not successfully received, the network device needs to schedule the terminal device to resend the TB (that is, schedule for retransmission). If the network device determines that the TB is successfully received, the network device schedules the terminal device to send a TB next to the TB (that is, schedule for new transmission).

Because the TB includes m CBs (m≥2), when actually receiving the TB, the network device may successfully receive one part of CBs in the TB but fail to receive the other part of CBs in the TB. Because the data volume of the TB is large, if the network device directly determines to schedule the terminal device to resend the entire TB, resource utilization is relatively low.

Currently, a concept of CBG retransmission is introduced into the NR system. To be specific, the m CBs in the TB are divided into M CBGs, and each CBG includes a same quantity of CBs. Because the terminal device sends the TB to the network device at a granularity of a CBG, the network device may determine, at a granularity of a CBG, whether receiving succeeds, and when determining that a CBG is not successfully received, schedule the terminal device to resend the unsuccessfully received CBG.

Figure 3:
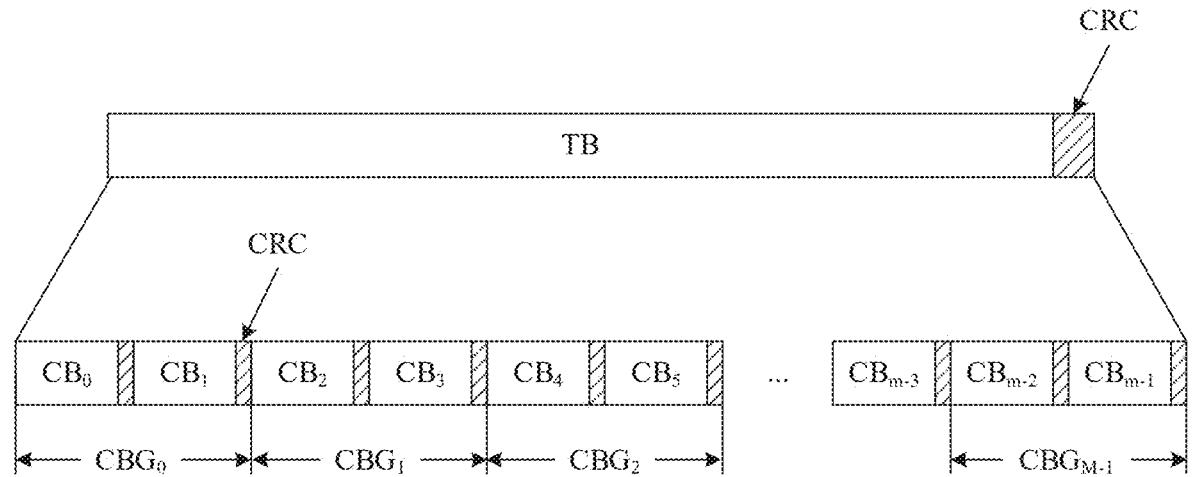
FIG. 3 is a schematic diagram in which a TB is divided into a plurality of CBGs according to an embodiment of this application.

FIG. 3 is a schematic diagram in which a TB is divided into a plurality of CBGs according to an embodiment of this application. For example, the TB includes m CBs, and every two CBs are divided into one CBG. In addition, each CBG corresponds to one cyclic redundancy check (cyclic redundancy check, CRC), and the CRC is used to verify whether the CBG is successfully received. When the terminal device sends the TB to the network device, if the network device determines, based on a CRC corresponding to each CBG in a $CBG_0$ to a $CBG_{M-1}$, that all CBGs other than a $CBG_1$ and a $CBG_3$ are successfully received, the network device needs to schedule the terminal device to resend only the $CBG_1$ and the $CBG_3$.

When the terminal device sends data to the network device, the following shows two possible implementations by way of example.

Figure 4A:
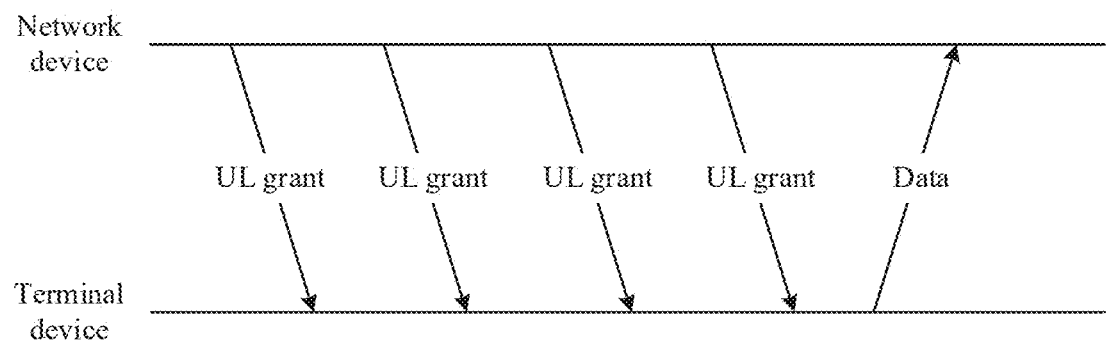
FIG. 4(a) is a schematic diagram in which a terminal device sends data to a network device according to an embodiment of this application.

FIG. 4(*a*) is an example of a schematic diagram in which a terminal device sends data to a network device. The network device pre-schedules an uplink resource (for example, uplink (uplink, UL) grant in FIG. 4(*a*)) for the terminal device, and the terminal device may send the data by using the pre-scheduled uplink resource. This implementation complies with a skipping mechanism supported by R14 LTE and NR protocols, and the terminal device may not perform uplink sending for a null packet.

Figure 4B:
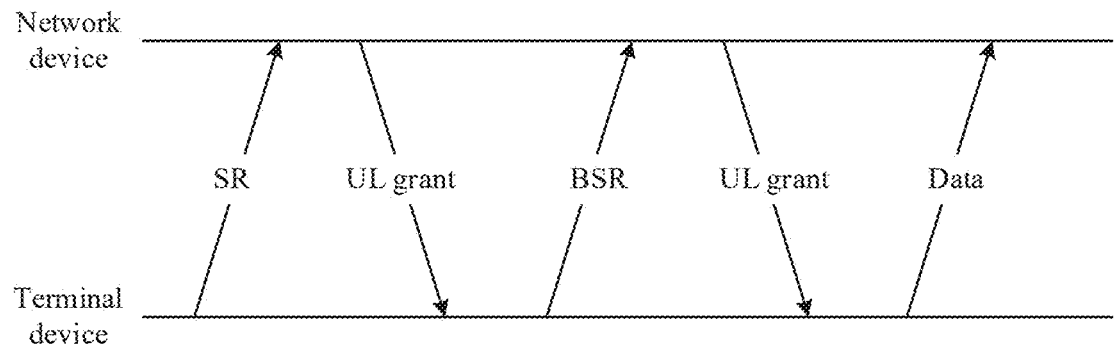
FIG. 4(b) is a schematic diagram in which another terminal device send data to a network device according to an embodiment of this application.

FIG. 4(*b*) is an example of another schematic diagram in which a terminal device sends data to a network device. The terminal device sends an SR to the network device. After receiving the SR, the network device schedules, for the terminal device, an uplink resource used to send a BSR (for example, a first UL grant in FIG. 4(*b*)). The BSR indicates a data volume of to-be-sent data of the terminal device. After receiving the BSR, the network device schedules, for the terminal device, an uplink resource used to send the to-be-sent data (for example, a second UL grant in FIG. 4(b)). The terminal device sends the to-be-sent data based on the uplink resource.

A data volume of a TB carried in an uplink resource scheduled by the network device for the terminal device may be greater than that of valid data that actually needs to be sent by the terminal device. The valid data is data that actually needs to be sent to the network device by the terminal device.

With reference to FIG. 4(b), in an example, after the network device receives the SR from the terminal device, the network device does not know a data volume of the BSR to be sent by the terminal device. Therefore, the data volume of the TB scheduled by the network device may be greater than that of the BSR. In another example, after receiving the BSR from the terminal device, the network device determines the data volume of the to-be-sent data of the terminal device. However, when the network device determines that uplink resources are sufficient, the data volume of the TB scheduled by the network device may also be greater than that of the to-be-sent data of the terminal device.

In this case, the terminal device pads the TB with invalid data. For example, a data volume of the TB scheduled by the network device is 20000 bits, but the terminal device needs to send only 12500 bits of valid data. In this case, the terminal device writes the 12500 bits of valid data into the TB, and then writes 7500 bits of invalid data into the TB. For example, with reference to a schematic diagram shown in FIG. 5, the terminal device writes 12500 bits of valid data into a $CB_0$ to a $CB_4$, and writes 7500 bits of invalid data into a $CB_5$ to a $CB_7$.

Figure 5:
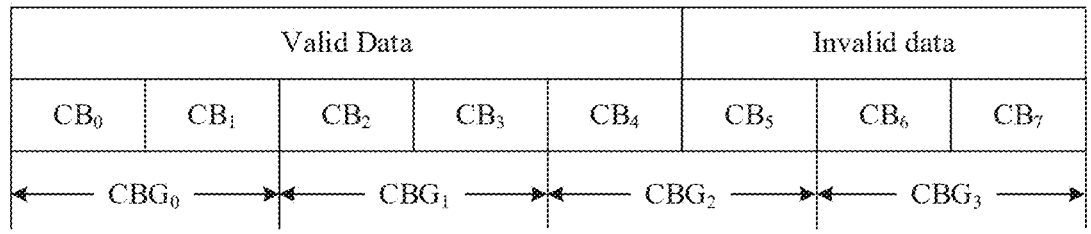
FIG. 5 is another schematic diagram in which a TB is divided into a plurality of CBGs according to an embodiment of this application.

Further, the terminal device groups the m CBs of the TB. FIG. 5 is still used as an example. The terminal device may use two CBs as one group to obtain four CBGs. Both a $CBG_0$ and a $CBG_1$ carry valid data, a $CBG_2$ carries valid data and invalid data (the $CBG_2$ includes the $CB_4$ and the $CB_5$, the $CB_4$ carries the valid data, and the $CB_5$ carries the invalid data), and a $CBG_3$ carries invalid data.

It can be learned from the foregoing description that a TBS scheduled by the network device is far greater than the data volume of the valid data of the terminal device, and a large amount of unnecessary uplink power consumption is caused when the terminal device sends a padding packet. In actual application, the valid data of the terminal device may also be referred to as a quantity of bits that need to be sent at a radio link control (radio link control, RLC) layer.

For example, Table 2 shows a relationship, between a TBS and a data volume of valid data, determined in a simulation process according to an embodiment of this application. Each hybrid automatic repeat request (hybrid automatic repeat request, HARQ) process corresponds to a TBS (a quantity of bits in a MAC_PDU) and a data amount of valid data (a quantity of bits in a SUB_PDU).

For example, in a HARQ process corresponding to ID2, a quantity of bits in a MAC_PDU is 20997, a quantity of bits in a SUB_PDU is 842, and a data volume of the SUB_PDU is far less than that of the MAC_PDU, that is, a data volume of valid data is far less than a TBS.

TABLE 2

| PDU type | HARQ ID | Quantity of bits |
|---|---|---|
| SUB_PDU | ID1 | 58 |
| MAC_PDU | ID1 | 20997 |

TABLE 2-continued

| PDU type | HARQ ID | Quantity of bits |
|---|---|---|
| SUB_PDU | ID2 | 842 |
| MAC_PDU | ID2 | 20997 |
| SUB_PDU | ID3 | 46 |
| MAC_PDU | ID3 | 20997 |
| SUB_PDU | ID4 | 69 |
| MAC_PDU | ID4 | 22026 |

When the terminal device sends the TB to the network device, the terminal device needs to send a large amount of invalid data to the network device. The invalid data increases unnecessary power consumption of the terminal device.

Figure 6:
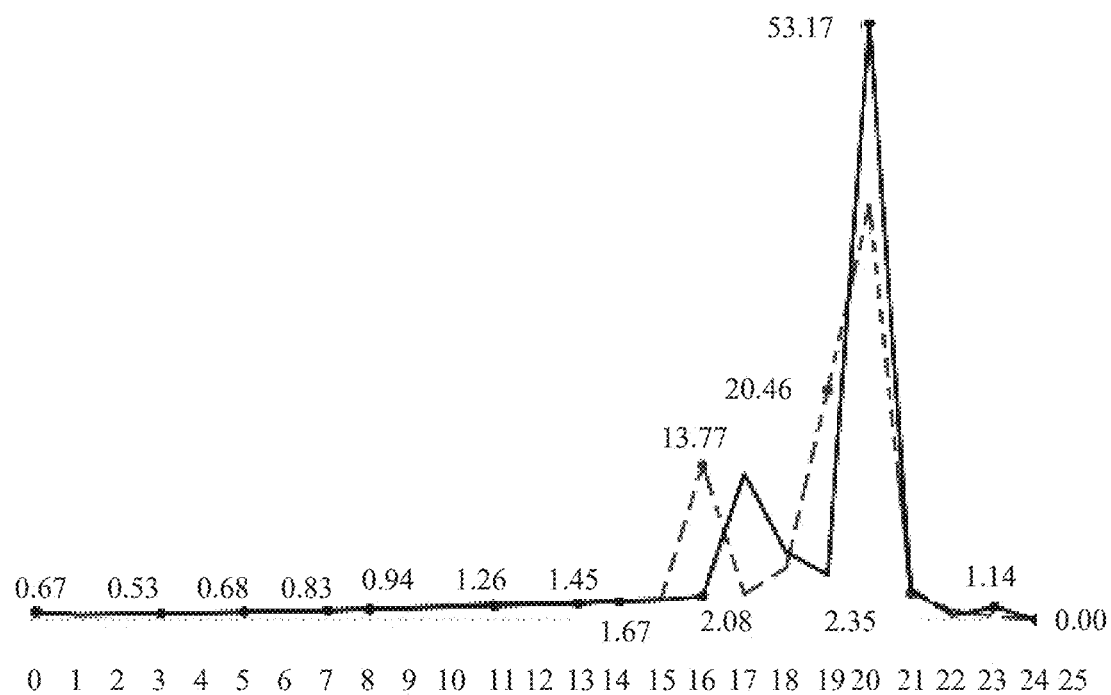
FIG. 6 is a comparison diagram of transmit powers of a terminal device in an LTE system and an NR system according to an embodiment of this application.

In a possible implementation, a transmit power in an NR system is greater than that in an LTE system. For example, FIG. 6 shows data statistics on transmit powers of a terminal device in an existing NR system and LTE system. In FIG. 6, a horizontal coordinate is a transmit power, a vertical coordinate is a transmit power proportion, a solid line is data statistics on transmit powers in the NR system, and a dashed line is data statistics on transmit powers in the LTE system. As shown in FIG. 6, most of the transmit powers of the terminal device in the NR system are close to a maximum transmit power, and the maximum transmit power is about 20 dB due to power backoff. The transmit powers of the terminal device in the NR system are generally higher than those in the LTE system. In particular, a proportion of transmit powers of 20 dB in the NR system is higher than that in the LTE system. The terminal device sends a large amount of invalid data to the network device. This further increases unnecessary power consumption of the terminal device.

In view of this, this application provides a communication method. A terminal device maps, to a first time domain resource, a first CBG used to carry valid data, and maps, to a second time domain resource, a second CBG used to carry invalid data. The terminal device sends the first CBG on the first time domain resource, and disables a transmission function on the second time domain resource (that is, the terminal device does not send the second CBG). This helps avoid unnecessary power consumption caused when the terminal device sends a TB to a network device.

The method may be applied to the communication system shown in FIG. 1. The network device may be the network device 101 in FIG. 1, and the terminal device may be the terminal device 102 or the terminal device 103 in FIG. 1. For details, refer to a schematic flowchart of a communication method shown in FIG. 7.

Step 701: The network device sends scheduling information to the terminal device.

Correspondingly, the terminal device receives the scheduling information from the network device. The scheduling information is used to indicate a time domain resource and a frequency domain resource on which the terminal device is to send a TB to the network device, and the terminal device may send the TB on the time domain resource and the frequency domain resource.

The network device may preconfigure an uplink resource for the terminal device, and send scheduling information of the uplink resource to the terminal device. Alternatively, the network device may configure an uplink resource for the terminal device based on a request of the terminal device, and send scheduling information of the uplink resource to the terminal device. An implementation in which the network device (pre-) configures the uplink resource for the terminal device is described in detail in the foregoing embodiment with reference to FIG. 4(a) or FIG. 4(b). Details are not described herein again.

Step 702: The terminal device determines a TB.

In a possible implementation, when the terminal device determines that a data volume of the TB is greater than that of valid data of the terminal device, the valid data of the terminal device may be carried in first to $n^{th}$ CBs in the TB, and $(n+1)^{th}$ to $m^{th}$ CBs may be padded with invalid data, where $1 \leq n < m$.

Further, the terminal device may divide the m generated CBs into M CBGs, and each CBG includes i CBs, where $i \geq 1$. Optionally, the terminal device may divide first to $k^{th}$ CBs into $M_1$ first CBGs, and divide $(k+1)^{th}$ to $m^{th}$ CBs into $M_2$ second CBGs, where $n \leq k < n+i$, $1 \leq M_1$, $1 \leq M_2$, and $M_1 + M_2 = M$.

In an implementation, the $M_1$ first CBGs are used to carry valid data, and the $M_2$ second CBGs are used to carry invalid data. In other words, when the terminal device groups the m CBs, the first to $n^{th}$ CBs that are used to carry valid data are all grouped into the $M_1$ first CBGs, and the $(n+1)^{th}$ to $m^{th}$ CBs that are used to carry invalid data are all grouped into the $M_2$ second CBGs. In this implementation, $k=n$.

In another implementation, the $M_1$ first CBGs are used to carry valid data and invalid data, and the $M_2$ second CBGs are used to carry invalid data. In other words, when the terminal device groups the m CBs, the first to $n^{th}$ CBs that are used to carry valid data and $(n+1)^{th}$ to $k^{th}$ CBs that are used to carry invalid data are grouped into the $M_1$ first CBGs, and $(k+1)^{th}$ to $m^{th}$ CBs that are used to carry invalid data are grouped into the $M_2$ second CBGs. In this implementation, $n < k < n+i$.

For example, with reference to FIG. 5, the TB includes eight CBs, the valid data of the terminal device occupies five CBs (the $CB_0$ to the $CB_4$), and the terminal device pads the $CB_5$ to the $CB_7$ with invalid data. Further, the terminal device divides a first CB to a sixth CB (the $CB_0$ to the $CB_5$) into three first CBGs (the $CBG_0$ to the $CBG_2$), and divides a seventh CB and an eighth CB (the $CB_7$ and a $CB_8$) into one second CBG (the $CBG_3$).

It may also be understood that the $M_1$ first CBGs of the terminal device are used to carry valid data, and the $M_2$ second CBGs are used to pad the TB. With reference to FIG. 5, the terminal device uses the $CB_0$ to the $CB_4$ to carry the valid data of the terminal device, and pads the $CB_5$ to the $CB_7$ with invalid data. In other words, the terminal device uses three first CBGs (the $CBG_0$ to the $CBG_2$) to carry valid data, and pads the TB with one second CBG (the $CBG_3$).

Further, the terminal device may map each of the M CBGs to an uplink resource. In an implementation, a scheduler uses a virtual resource block and a group of orthogonal frequency division multiplexing (orthogonal frequency division multiplexing, OFDM) symbols to define a time-frequency resource for a transmission, and modulation symbols are mapped to a time-frequency resource specified by the scheduler in an order of first frequency domain and then time domain.

It should be noted that this embodiment of this application is mainly applicable to mapping CBGs to different time domain resources, so that valid data and invalid data are separated in time domain. For details, refer to the following embodiments.

In this embodiment of this application, the terminal device determines, based on a quantity $M_1$ of first CBGs and a quantity $M_2$ of second CBGs, time domain resources corresponding to the TB as the first time domain resource and the second time domain resource. It may also be understood that the terminal device divides the time domain resources corresponding to the TB into the first time domain resource corresponding to the $M_1$ first CBGs and the second time domain resource corresponding to the $M_2$ second CBGs, or it may be understood that the terminal device maps the $M_1$ first CBGs to the first time domain resource, and maps the $M_2$ second CBGs to the second time domain resource.

When the terminal device determines the first time domain resource and the second time domain resource, there are the following two examples.

Example 1: The time domain resources corresponding to the TB include $M_1$ first time domain resources and $M_2$ second time domain resources, and the $M_1$ first time domain resources and the $M_2$ second time domain resources do not overlap. The terminal device maps the $M_1$ first CBGs to the $M_1$ first time domain resources, and maps the $M_2$ second CBGs to the $M_2$ second time domain resources.

Example 2: The time domain resources corresponding to the TB include one first time domain resource and one second time domain resource, the first time domain resource includes $M_1$ time domain resources, the second time domain resource includes $M_2$ time domain resources, and the first time domain resource and the second time domain resource do not overlap. The terminal device separately maps the $M_1$ first CBGs to the $M_1$ time domain resources of the first time domain resource, and maps the $M_2$ second CBGs to the $M_2$ time domain resources of the second time domain resource.

In this way, the terminal device separately maps the M CBGs to different time domain resources, to isolate the M CBGs in time domain, so that the terminal device can send data at a granularity of a CBG, and can send a first CBG to the network device on a first time domain resource corresponding to the first CBG.

In this embodiment of this application, the first time domain resource may include at least one time-domain symbol, and the second time domain resource may also include at least one time-domain symbol. The time-domain symbol may be an OFDM symbol, or may be a discrete Fourier transform-spread-OFDM (discrete fourier transform-spread-OFDM, DFT-s-OFDM) symbol.

The following uses a low density parity check code (low density parity check code, LDPC) coding scheme as an example to describe that the terminal device determines the first CBG and the second CBG, maps the first CBG to the first time domain resource, and maps the second CBG to the second time domain resource.

The terminal device determines that a quantity of generated CBs is $m_{CB}$, as shown in formula (1).

$$m_{CB} = \lceil B_{TB}/(B_{CB}-B_L) \rceil \quad (1)$$

$B_{TB}$ is a quantity of bits of the TB determined by the terminal device or a quantity of bits input to an encoder of the terminal device; $B_L$ is a quantity of bits occupied by a check bit; and $B_{CB}$ is a quantity of bits of each CB in the LDPC. For example, a maximum quantity of bits of a CB in the LDPC is $B_{CB-max}=8448$; and a minimum quantity of bits of a CB in the LDPC is $B_{CB-min}=3840$.

A quantity $m_{CB1}$ of CBs occupied by the valid data of the terminal device is shown in formula (2).

$$m_{CB1} = \lceil B_1/(B_{CB}-B_L) \rceil \quad (2)$$

In the formula, $B_1$ is a quantity of bits of the valid data of the terminal device.

If $m_{CB1} < m_{CB}$, the terminal device determines that a quantity of CBs occupied by the invalid data is $m_{CB2}$, as shown in formula (3).

$$m_{CB2} = m_{CB} - m_{CB1} \quad (3)$$

A quantity of CBGs used to carry valid data is $M_{CBG1}$, as shown in formula (4).

$$M_{CBG1} = \lceil m_{CB1}/i \rceil \quad (4)$$

In the formula, i is a quantity of CBs included in each CBG.

The terminal device determines that a quantity of sent CBs is $m_{CB\text{-}send}$, as shown in formula (5).

$$m_{CB\text{-}send} = i \times M_{CBG1} \quad (5)$$

For example, each TB corresponds to one slot (slot), and each slot includes 14 time-domain symbols. In this case, the terminal device determines a quantity $N_{quantity\ of\ time\text{-}domain\ symbols}$ of sent time-domain symbols, as shown in formula (6).

$$N_{quantity\ of\ time\text{-}domain\ symbols} = (m_{CB\text{-}send}/m_{CB}) \times 14 \quad (6)$$

For example, if it is determined that $N_{quantity\ of\ time\text{-}domain\ symbols} = 5$, it indicates that first to fifth time-domain symbols correspond to the first time domain resource and may be used to transmit $M_{CBG1}$ CBGs, and sixth to fourteenth time-domain symbols correspond to the second time domain resource are not used to transmit a CBG.

Step 702 may further include: The terminal device determines that the data volume of the TB is not less than that of the valid data of the terminal device. The terminal device determines at least one TB. If the terminal device determines that a last TB in the at least one TB is not fully padded with the valid data of the terminal device, the terminal device pads the last TB with invalid data. In this case, this embodiment of this application may be implemented for the last TB.

Step 703: The terminal device sends the first CBG to the network device on the first time domain resource, and disables the transmission function of the terminal device on the second time domain resource.

It can be learned from step 702 that the second CBG carries invalid data, and the terminal device does not need to send the invalid data to the network device. Therefore, the terminal device may send the first CBG to the network device on the first time domain resource, and does not send the second CBG to the network device on the second time domain resource.

Herein, in an implementation, whether the terminal device sends the CBG to the network device is whether the terminal device enables the transmission function of the terminal device. In other words, the terminal device may enable the transmission function on the first time domain resource to transmit the first CBG to the network device, and disable the transmission function on the second time domain resource to skip transmitting the second CBG to the network device.

In specific implementation, a radio frequency unit in the terminal device is configured to convert a baseband signal generated by the terminal device into a radio frequency signal, and transmit the radio frequency signal through an antenna. A power amplifier (power amplifier, PA) in the radio frequency unit is specifically configured to amplify radio frequency power of a signal, so as to transmit the signal to the network device through an antenna. When the PA works, relatively large power is consumed. Therefore, the radio frequency unit may turn on the PA on the first time domain resource and turn off the PA on the second time domain resource, to reduce unnecessary power consumption of the terminal device.

In addition, a physical layer in the terminal device maps CBGs to different time domain resources. In this case, the physical layer may determine the second time domain resource used to transmit the second CBG, that is, the physical layer determines a time-domain symbol on which the PA needs to be turned off. Further, the physical layer may send an identifier of the time-domain symbol to the radio frequency unit, and the radio frequency unit turns off the PA on the time-domain symbol.

In this embodiment of this application, the terminal device sends the first CBG on the first time domain resource, and disables the transmission function on the second time domain resource (that is, does not send the second CBG), to reduce power consumption of the terminal device. In addition, the terminal device does not send the second CBG (newly transmit or retransmit the second CBG), so that interference between uplink signals in an entire NR system can be reduced, and uplink resource utilization can be improved.

Step 704: If the network device successfully receives the first CBG on the first time domain resource, and determines, on the second time domain resource, that the terminal device does not enable the transmission function, the network device determines that the TB is successfully received.

Herein, the network device may perform discontinuous transmission (discontinuous transmission, DTX) detection at a time-domain symbol level, to detect, on each time-domain symbol, whether the terminal device has a transmit power, that is, determine, on each time-domain symbol, whether the terminal device enables the transmission function or transmits data. If determining that the terminal device has the transmit power, the network device further determines whether the received data is correct. If determining that the terminal device does not have the transmit power, the network device determines that no data is received. In other words, the network device does not need to determine correctness of the data, and does not schedule the terminal device to perform retransmission.

In other words, the terminal device enables the transmission function on the first time domain resource. Correspondingly, the network device detects, on the first time domain resource, a signal transmitted by the terminal device, and determines whether the data sent by the terminal device is successfully received. The terminal device does not enable the transmission function on the second time domain resource. Correspondingly, the network device does not detect, on the second time domain resource, a signal transmitted by the terminal device, and does not schedule the terminal device to perform retransmission when the network device does not receive data sent by the terminal device.

In a specific implementation, if detecting, on the first time domain resource, the signal transmitted by the terminal device, the network device receives the $M_1$ first CBGs from the terminal device, and determines whether each first CBG is successfully received. Specifically, for each first CBG, the network device determines, based on a CRC corresponding to the first CBG, whether the first CBG is successfully received. If determining that the first CBG is not successfully received, the network device schedules retransmission of the first CBG. If the network device does not detect, on the second time domain resource, the signal transmitted by the terminal device, the network device does not receive the $M_2$ second CBGs from the terminal device, and does not schedule the terminal device to retransmit any second CBG.

That is, if determining that the $M_1$ first CBGs are all successfully received, the network device determines that the valid data or the TB from the terminal device is successfully received. Further, the network device may schedule the terminal device to send a next TB. A specific implementation of sending the next TB is similar to that of sending the TB. Details are not described again.

In this embodiment of this application, if determining, on the first time domain resource, that the terminal device sends the data, the network device determines whether the first CBG is successfully received. If determining, on the second time domain resource, that the terminal device does not send the data, the network device does not need to determine whether the second CBG is successfully received. This can reduce a workload of the network device compared with the conventional technology in which the network device needs to detect the first CBG received on the first time domain resource and detect the second CBG received on the second time domain resource. In addition, the network device does not schedule the terminal device to retransmit the second CBG, so that interference between uplink signals in an entire NR system can be reduced, and uplink resource utilization can be improved.

Figure 8:
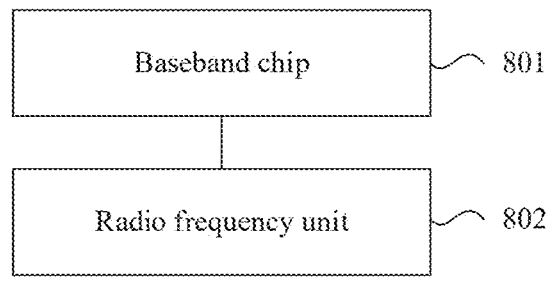
FIG. 8 is a schematic diagram of a structure of another terminal device according to an embodiment of this application.

Based on the foregoing content and a same concept, FIG. 8 is a schematic diagram of a structure of a terminal device according to an embodiment of this application. As shown in FIG. 8, the terminal device includes a baseband chip 801 and a radio frequency unit 802. For example, the baseband chip 801 may be located in the processor 110 shown in FIG. 2, and is configured to synthesize baseband signals to be transmitted. The radio frequency unit 802 may be located in the mobile communication module 150 shown in FIG. 2, and is configured to convert a baseband signal into a radio frequency signal.

For example, the baseband chip 801 is configured to perform the step 702: determining the TB, and separately mapping the M CBGs to different time domain resources. The radio frequency unit 802 is configured to perform the step 703: sending the first CBG to the network device, and disabling the transmission function of the terminal device on the second time domain resource.

Figure 9:
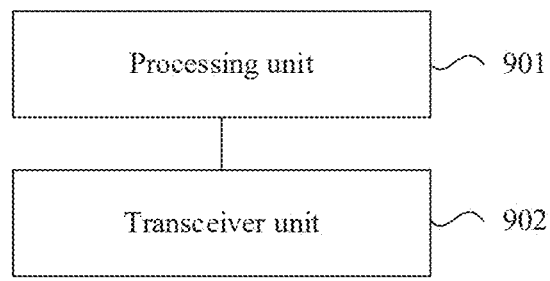
FIG. 9 is a schematic diagram of a structure of a communication apparatus according to an embodiment of this application.
Figure 10:
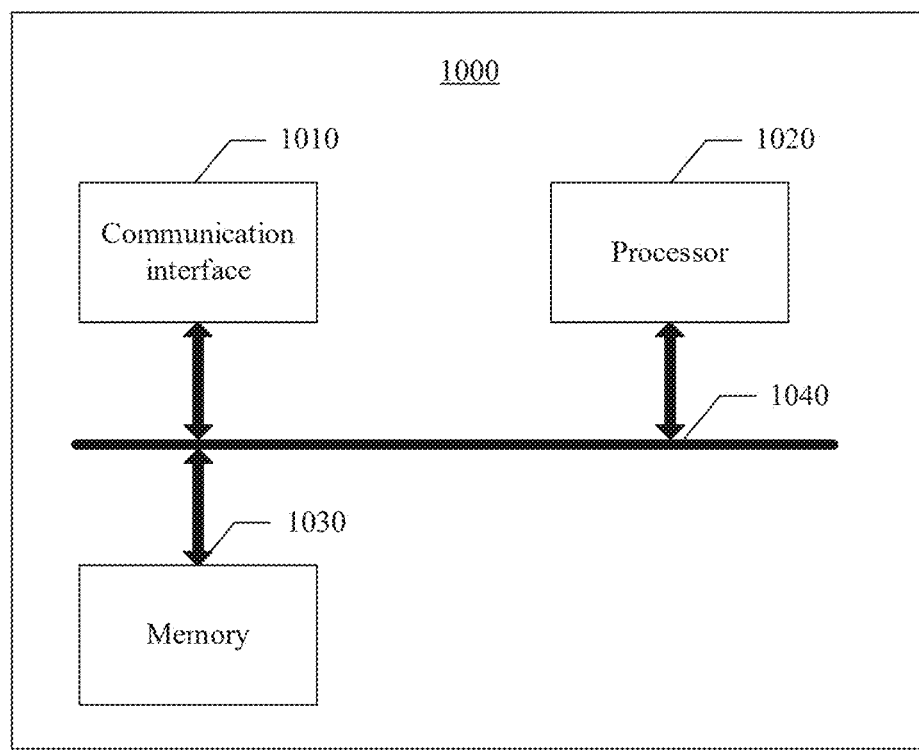
FIG. 10 is a schematic diagram of a structure of another communication apparatus according to an embodiment of this application.

Based on the foregoing content and a same concept, FIG. 9 and FIG. 10 each are a schematic diagram of a possible structure of a communication apparatus according to this application. The communication apparatus may be configured to implement functions of the terminal device or the network device in the foregoing method embodiment. Therefore, advantageous effects of the foregoing method embodiment can also be implemented.

In this application, the communication apparatus may be the terminal device 102 or the terminal device 103 shown in FIG. 1, or may be the network device 101 shown in FIG. 1, or may be a module (for example, a chip) applied to the terminal device or the network device.

As shown in FIG. 9, the communication apparatus 900 includes a processing unit 901 and a transceiver unit 902.

Figure 7:
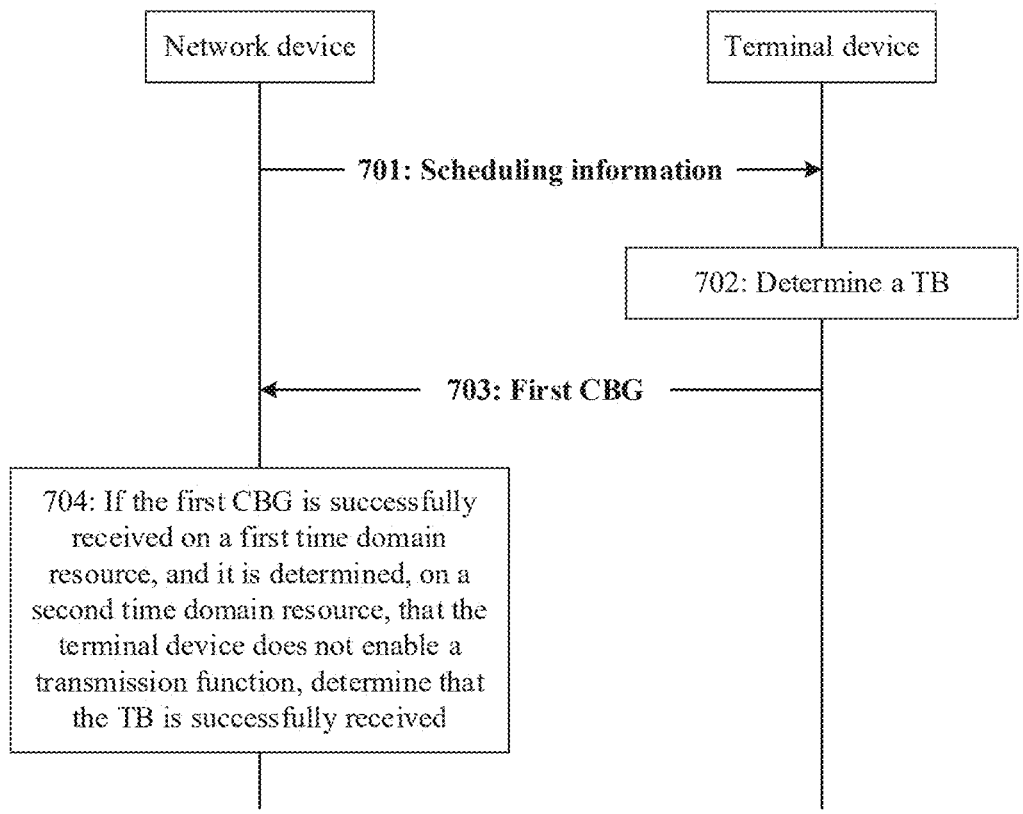
FIG. 7 is a schematic flowchart of a communication method according to an embodiment of this application.

When a communication apparatus 900 is configured to implement functions of the terminal device in the method embodiment shown in FIG. 7, the processing unit 901 may be the processor 110 in FIG. 2, and the transceiver unit 902 may be the mobile communication module 150 in FIG. 2.

The processing unit 901 is configured to determine a TB. The TB includes a first CBG and a second CBG. The first CBG is used to carry valid data of the terminal device, or the first CBG is used to carry valid data and invalid data of the terminal device. The second CBG is used to carry invalid data of the terminal device. The first CBG corresponds to a first time domain resource, the second CBG corresponds to a second time domain resource, and the first time domain resource and the second time domain resource do not overlap. The processing unit 901 is further configured to control the transceiver unit 902 to transmit the first CBG to the network device on the first time domain resource, and disable a transmission function of the terminal device on the second time domain resource.

In a possible implementation, the processing unit 901 is specifically configured to: determine that the TB includes m CBs, where m≥2; use first to $n^{th}$ CBs to carry the valid data of the terminal device, and pad $(n+1)^{th}$ to $m^{th}$ CBs with the invalid data, where 1≤n<m; and divide first to $k^{th}$ CBs into at least one first CBG, and divide $(k+1)^{th}$ to $m^{th}$ CBs into at least one second CBG. Each first CBG includes i CBs. and each second CBG includes i CBs, where n≤k<n+i, and i≥1.

In a possible implementation, the processing unit 901 is specifically configured to determine, based on a quantity of first CBGs and a quantity of second CBGs, time domain resources corresponding to the TB as the first time domain resource and the second time domain resource.

In a possible implementation, a time domain resource is a time-domain symbol.

When the communication apparatus 900 is configured to implement functions of the network device in the method embodiment shown in FIG. 7.

The transceiver unit 902 sends scheduling information to the terminal device. The scheduling information is used to indicate a time domain resource on which the terminal device sends a TB. The TB includes a first CBG and a second CBG. The first CBG carries valid data of the terminal device, or the first CBG carries valid data and invalid data of the terminal device. The second CBG carries invalid data of the terminal device. The first CBG corresponds to a first time domain resource, the second CBG corresponds to a second time domain resource, and the first time domain resource and the second time domain resource do not overlap. If the processing unit 901 determines, on the first time domain resource, that the transceiver unit 902 successfully receives the first CBG, and determines, on the second time domain resource, that the terminal device does not enable a transmission function, the processing unit determines that the TB is successfully received.

In a possible implementation, the processing unit 901 is specifically configured to: control the transceiver unit 902 to receive the first CBG on the first time domain resource, and determine that the first CBG is successfully decoded.

FIG. 10 shows a communication apparatus 1000 according to an embodiment of this application. The apparatus shown in FIG. 10 may be an implementation of a hardware circuit of the apparatus shown in FIG. 9. The communication apparatus is applicable to the flowchart shown in FIG. 7, and performs functions of the terminal device or the network device in the foregoing method embodiment. For ease of description. FIG. 10 shows only main components of the communication apparatus.

The communication apparatus 1000 shown in FIG. 10 includes at least one processor 1020, configured to implement any method in FIG. 7 provided in embodiments of this application.

The communication apparatus 1000 may further include at least one memory 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions stored in the memory 1030. At least one of the at least one memory may be included in the processor.

In an implementation process, steps of the foregoing method can be implemented by using a hardware integrated logical circuit in the processor, or by using instructions in a form of software. The steps of the method disclosed with reference to embodiments of this application may be directly performed and completed by a hardware processor, or may be performed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing method in combination with hardware of the processor. To avoid repetition, details are not described herein again.

It should be noted that, the processor in this embodiment of this application may be an integrated circuit chip, and has a signal processing capability. In an implementation process, the steps in the foregoing method embodiment can be implemented by using a hardware integrated logical circuit in the processor, or by using instructions in a form of software. The foregoing processor may be a general-purpose processor, a digital signal processing circuit (digital signal processor, DSP), an application-specific integrated circuit (application-specific integrated circuit, ASIC), a field programmable gate array (field programmable gate array, FPGA), another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. The steps of the method disclosed with reference to embodiments of this application may be directly executed and accomplished by using a hardware decoding processor, or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing method in combination with hardware of the processor.

It may be understood that the memory in this embodiment of this application may be a volatile memory or a nonvolatile memory, or may include a volatile memory and a nonvolatile memory. The nonvolatile memory may be a read-only memory (read-only memory. ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM), and is used as an external cache. By way of example, and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these and any memory of another proper type.

The communication apparatus 1000 may further include a communication interface 1010, configured to communicate with another device by using a transmission medium, so that an apparatus used in the communication apparatus 1000 can communicate with the another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

The communication apparatus 1000 may further include a communication line 1040. The communication interface 1010, the processor 1020, and the memory 1030 may be connected to each other through the communication line 1040. The communication line 1040 may be a peripheral component interconnect (peripheral component interconnect, PCI) bus, an extended industry standard architecture (extended industry standard architecture, EISA) bus, or the like. The communication line 1040 may be classified into an address bus, a data bus, a control bus, and the like. For ease of representation, only one thick line is for representing the bus in FIG. 10, but this does not mean that there is only one bus or only one type of bus.

For example, when the communication apparatus 1000 implements functions of the terminal device in the procedure shown in FIG. 7, the processor 1020 may be the processor 110 in FIG. 2, and the communication interface 1010 may be the mobile communication module 150 in FIG. 2.

The processor 1020 is configured to determine a TB. The TB includes a first CBG and a second CBG. The first CBG is used to carry valid data of the terminal device, or the first CBG is used to carry valid data and invalid data of the terminal device. The second CBG is used to carry invalid data of the terminal device. The first CBG corresponds to a first time domain resource, the second CBG corresponds to a second time domain resource, and the first time domain resource and the second time domain resource do not overlap. The processor 1020 is further configured to control the communication interface 1010 to transmit the first CBG to the network device on the first time domain resource, and disable a transmission function of the terminal device on the second time domain resource.

For example, when the communication apparatus 1000 implements functions of the network device in the procedure shown in FIG. 7.

The communication interface 1010 sends scheduling information to the terminal device. The scheduling information is used to indicate a time domain resource on which the terminal device sends a TB. The TB includes a first CBG and a second CBG. The first CBG carries valid data of the terminal device, or the first CBG carries valid data and invalid data of the terminal device. The second CBG carries invalid data of the terminal device. The first CBG corresponds to a first time domain resource, the second CBG corresponds to a second time domain resource, and the first time domain resource and the second time domain resource do not overlap. If the processor 1020 determines, on the first time domain resource, that the communication interface 1010 successfully receives the first CBG, and determines, on the second time domain resource, that the terminal device does not enable a transmission function, the processor determines that the TB is successfully received.

Based on the foregoing content and a same concept, this application provides a chip, including a processor and an interface circuit. The interface circuit is configured to receive code instructions and transmit the code instructions to the processor. When the processor runs the code instructions, a communication apparatus is enabled to perform the method in the embodiment shown in FIG. 7 by using a terminal device side or a network device side.

Based on the foregoing content and a same concept, this application provides a computer-readable storage medium. The computer-readable storage medium stores a computer program or instructions. When the computer program or the instruction is/are executed by a communication apparatus, the communication apparatus is enabled to perform the method in the embodiment shown in FIG. 7 by using a terminal device side or a network device side.

Based on the foregoing content and a same concept, this application provides a computer program product. The computer program product includes a computer program or instructions. When the computer program or the instructions is/are executed by a communication apparatus, the communication apparatus is enabled to perform the method in the embodiment shown in FIG. 7 by using a terminal device side or a network device side.

The term "for example" in embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In embodiments of this application, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural. "And/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or all or a part of the technical solutions may be implemented in the form of a software product. The computer software product is stored in a storage medium and includes several instructions for instructing a computer device (which may be a personal computer, a server, or a network device) or a processor (processor) to perform all or a part of the steps of the method described in the embodiments of this application. The foregoing storage medium includes: any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a communication system, the method comprising:
   determining, by a terminal device of the communication system, a transport block (TB) comprising a first code block group (CBG) and a second CBG, wherein the first CBG carries valid data of the terminal device or carries the valid data and invalid data of the terminal device, wherein the second CBG carries the invalid data, wherein the first CBG corresponds to a first time domain resource, wherein the second CBG corresponds to a second time domain resource, and wherein the first time domain resource and the second time domain resource do not overlap;

sending, by the terminal device, the first CBG to a network device of the communication system on the first time domain resource;

disabling, by the terminal device, a transmission function of the terminal device on the second time domain resource, so that the terminal device does not send the second CBG to the network device;

successfully receiving, by the network device, the first CBG on the first time domain resource;

determining, by the network device, that the terminal device does not enable the transmission function during the second time domain resource;

determining, by the network device in response to receiving the first CBG on the first time domain resource and determining that the terminal device does not enable the transmission function, that the TB is successfully received;

determining, by the terminal device, that the TB comprises m code blocks (CBs), wherein m≥2;

setting, by the terminal device, first to $n^{th}$ CBs to carry the valid data, wherein 1≤n<m;

padding, by the terminal device, $(n+1)^{th}$ to $m^{th}$ CBs with the invalid data;

dividing, by the terminal device, first to $k^{th}$ CBs into at least one first CBG, wherein each of the at least one first CBG comprises i CBs, wherein n≤k<n+i, and wherein i≥1; and dividing, by the terminal device, $(k+1)^{th}$ to the $m^{th}$ CBs into at least one second CBG, wherein each of the at least one second CBG comprises i CBs.

2. The method of claim 1, further comprising determining, by the terminal device based on a quantity of first CBGs and a quantity of second CBGs, time domain resources corresponding to the TB as the first time domain resource and the second time domain resource.

3. The method of claim 1, wherein determining, by the network device, that the TB is successfully received comprises determining, by the network device, that the first CBG is successfully decoded.

4. The method of claim 1, wherein the first time domain resource comprises at least one first time-domain symbol, and wherein the second time domain resource comprises at least one second time-domain symbol.

5. The method of claim 1, wherein before determining the TB, the method further comprises:
pre-scheduling, by the network device, an uplink resource for the terminal device; and
sending, by the network device, scheduling information of the uplink resource to the terminal device.

6. The method of claim 1, wherein before determining the TB, the method further comprises:
receiving, by the network device from the terminal device, a request for scheduling an uplink resource for the terminal device;
configuring, by the network device, the uplink resource for the terminal device; and sending, by the network device, scheduling information of the uplink resource to the terminal device.

7. The method of claim 1, wherein the valid data is data that needs to be sent to the network device by the terminal device, and the invalid data is padding data.

8. A method implemented by a terminal device, the method comprising:
determining a transport block (TB) comprising a first code block group (CBG) and a second CBG, wherein the first CBG carries valid data of the terminal device or carries the valid data and invalid data of the terminal device, wherein the second CBG carries the invalid data, wherein the first CBG corresponds to a first time domain resource, wherein the second CBG corresponds to a second time domain resource, and wherein the first time domain resource and the second time domain resource do not overlap;
sending the first CBG to a network device on the first time domain resource;
disabling a transmission function of the terminal device on the second time domain resource, so that the terminal device does not send the second CBG to the network device;
determining that the TB comprises m code blocks (CBs), wherein m≥2;
setting first to $n^{th}$ CBs to carry the valid data, wherein 1≤n<m;
padding $(n+1)^{th}$ to $m^{th}$ CBs with the invalid data;
dividing first to $k^{th}$ CBs into at least one first CBG, wherein each of the at least one first CBG comprises i CBs, wherein n≤k<n+i, and wherein i≥1; and
dividing $(k+1)^{th}$ to the $m^{th}$ CBs into at least one second CBG, wherein each of the at least one second CBG comprises i CBs.

9. The method of claim 8, further comprising determining, based on a quantity of first CBGs and a quantity of second CBGs, time domain resources corresponding to the TB as the first time domain resource and the second time domain resource.

10. The method of claim 8, wherein the first time domain resource comprises at least one first time-domain symbol, and wherein the second time domain resource comprises at least one second time-domain symbol.

11. The method of claim 8, wherein before determining the TB, the method further comprises receiving, from the network device, scheduling information of an uplink resource to the terminal device.

12. The method of claim 8, wherein before determining the TB, the method further comprises:
sending, to the network device, a request for scheduling an uplink resource for the terminal device; and
receiving, from the network device, scheduling information of the uplink resource.

13. The method of claim 8, wherein the valid data is data that needs to be sent to the network device by the terminal device, and the invalid data is padding data.

14. A terminal device comprising:
a memory configured to store instructions; and
at least one processor coupled to the memory and configured to execute the instructions to cause the terminal device to:
determine a transport block (TB) comprising a first code block group (CBG) and a second CBG, wherein the first CBG carries valid data of the terminal device or carries the valid data and invalid data of the terminal device, wherein the second CBG carries invalid data of the terminal device, wherein the first CBG corresponds to a first time domain resource, wherein the second CBG corresponds to a second time domain resource, and wherein the first time domain resource and the second time domain resource do not overlap;
send the first CBG to a network device on the first time domain resource;

disable a transmission function of the terminal device on the second time domain resource, so that the terminal device does not send the second CBG to the network device;

determine that the TB comprises m code blocks (CBs), wherein m≥2;

set first to $n^{th}$ CBs to carry the valid data;

pad $(n+1)^{th}$ to $m^{th}$ CBs with the invalid data, wherein 1≤n<m;

divide first to $k^{th}$ CBs into at least one first CBG, wherein the at least one first CBG comprises i CBs, wherein n≤k<n+i, and wherein i≥1; and divide $(k+1)^{th}$ to the $m^{th}$ CBs into at least one second CBG, wherein the at least one second CBG comprises i CBs.

15. The terminal device of claim 14, wherein the at least one processor is further configured to execute the instructions to cause the terminal device to determine based on a quantity of first CBGs and a quantity of second CBGs, time domain resources corresponding to the TB as the first time domain resource and the second time domain resource.

16. The terminal device of claim 14, wherein the first time domain resource comprises at least one first time-domain symbol, and wherein the second time domain resource comprises at least one second time-domain symbol.

17. The terminal device of claim 14, wherein before determining the TB, the at least one processor is further configured to execute the instructions to cause the terminal device to receive, from the network device, scheduling information of an uplink resource to the terminal device.

18. The terminal device of claim 14, wherein before determining the TB, the at least one processor is further configured to execute the instructions to cause the terminal device to:

send, to the network device, a request for scheduling an uplink resource for the terminal device; and receive, from the network device, scheduling information of the uplink resource.

19. The terminal device of claim 14, wherein the at least one processor is further configured to execute the instructions to cause the terminal device to further set the first to $n^{th}$ CBs to carry the invalid data.

20. The terminal device of claim 14, wherein the valid data is data that needs to be sent to the network device by the terminal device, and the invalid data is padding data.

* * * * *